(12) United States Patent
De Franceschi

(10) Patent No.: US 7,200,890 B2
(45) Date of Patent: Apr. 10, 2007

(54) APPARATUS FOR PREPARING THE WELDING REGION ON THE OUTER SURFACE OF PLASTIC PIPES

(75) Inventor: Bruno De Franceschi, Padua (IT)

(73) Assignee: Ritmo S.p.A, Teolo (IT)

( * ) Notice: Subject to any disclaimer, the term of this patent is extended or adjusted under 35 U.S.C. 154(b) by 240 days.

(21) Appl. No.: 10/940,680

(22) Filed: Sep. 15, 2004

(65) Prior Publication Data
US 2005/0077008 A1    Apr. 14, 2005

(30) Foreign Application Priority Data
Oct. 10, 2003    (IT)    ............... PD2003A0241

(51) Int. Cl.
*B08B 9/023*    (2006.01)
(52) U.S. Cl. ............... 15/104.04; 15/104.03
(58) Field of Classification Search ............. 15/104.03, 15/104.04
See application file for complete search history.

(56) References Cited
U.S. PATENT DOCUMENTS

| | | | |
|---|---|---|---|
| 1,939,147 A | 12/1933 | Snyder | |
| 2,985,459 A | 5/1961 | Leiss | |
| 3,421,492 A | 1/1969 | Brown | |
| 3,540,329 A | 11/1970 | Gill | |
| 3,999,452 A * | 12/1976 | Larsen | ............... 82/113 |
| 4,614,136 A | 9/1986 | Pertle | |
| 4,744,123 A * | 5/1988 | Le Testu et al. | ......... 15/104.04 |

FOREIGN PATENT DOCUMENTS

EP    0 740 974    11/1996

* cited by examiner

*Primary Examiner*—Randall Chin
(74) *Attorney, Agent, or Firm*—Modiano & Associati; Albert Josif; Daniel J. O'Byrne

(57) ABSTRACT

An apparatus for preparing the welding region on the outer surface of plastic pipes, comprising elements for anchoring to a pipe; a threaded pivot being coupled to the anchoring elements to perform a longitudinal, rotary and translational motion; supporting elements for a tool being jointly coupled to the threaded pivot, that can be arranged so as to interfere with, and remove material from, the outer surface of the pipe. The anchoring elements comprise a central body with longitudinal sliding guides thereon for rod-like elements, which protrude partially from the central body, do not intersect each other, and support at ends feet for resting against the inner surface of the pipe. Respective racks are provided longitudinally on the rod-like elements and are kinematically connected to a common actuation gear system.

9 Claims, 3 Drawing Sheets

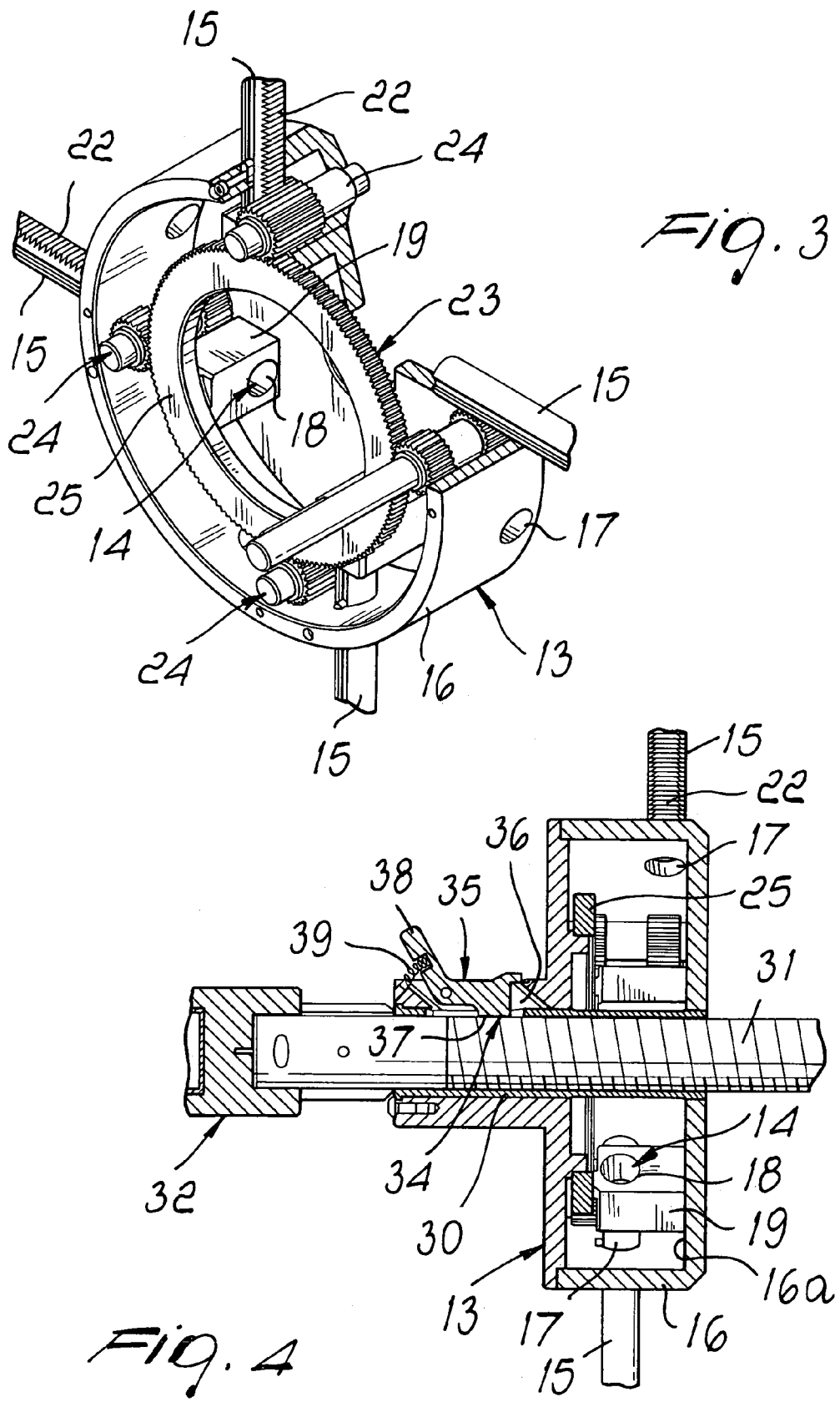

APPARATUS FOR PREPARING THE WELDING REGION ON THE OUTER SURFACE OF PLASTIC PIPES

The present invention relates to an apparatus for preparing the welding region on the outer surface of plastic pipes.

BACKGROUND OF THE INVENTION

Coupling connectors are currently used to connect adjacent segments of plastic pipe, especially for pipes having substantial diameters.

These connectors are substantially constituted by a collar, which surrounds the end regions of a pair of mutually aligned thermoplastic pipes.

An electric resistor is inserted in the inner part of the connector.

By passing electric current through said resistor, the end portions of the pipes are fused together.

Experience and practice in the field have shown that to provide an optimum joint it is necessary to clean the ends of the pipes to be welded before applying the connector.

Cleaning the ends relates to eliminating mud, moisture and sand, but also to removing the layer of oxide that inevitably forms on the outer surface of plastic pipes.

Originally, the end parts of the pipes to be joined were generally cleaned by hand.

However, this manual cleaning entailed several drawbacks, including the one related to the fact that a human operator had to assess arbitrarily the amount of material that he was removing, and such an assessment is extremely difficult to perform on site.

Moreover, manual elimination of the material was never uniform and could case imbalances that had a negative effect on the successful outcome of the welding.

Moreover, manual removal was time-consuming and ultimately expensive in terms of work time.

In order to avoid these drawbacks, a plurality of devices have been devised which are suitable to eliminate, in a substantially semiautomatic or automatic manner, a layer of material and therefore to prepare the end part of the pipes to be welded.

One of these apparatuses is disclosed in EP-0740974 in the name of the same Applicant/Inventor.

This apparatus comprises anchoring means, which are fixed, in the active configuration, to the end region of the pipe, and to which a threaded pivot is coupled so that it can perform a longitudinal rotary and translational motion; said pivot is arranged axially with respect to the pipe, and supporting means for a tool that can be positioned so as to interfere with, and remove material from, the outer surface of the end portion of the pipe, are coupled to said pivot so that they rotate monolithically therewith.

The anchoring means comprise a substantially cylindrical element, which is shaped at one end so as to form a circumferential slot and is shaped at the other end so as to form radial guides for elements for anchoring to the pipe.

The supporting means comprise a first telescopic rod-like arm, which is fixed radially by means of one of its ends to the free end of said threaded pivot, and a second rod-like arm, which is fixed by means of one of its ends to the free end of said first arm and supports the tool.

Although this apparatus achieves its task and improves substantially work quality and times with respect to manual preparation, it has been found susceptible of improvements.

Such apparatus in fact has limited functionality in relation to the diameters of the pipes that can be worked, due to the dimensional constraints between the substantially cylindrical element and the radial guides (the diameter of the former limits the maximum length of the radial guides and therefore the maximum pipe diameter to which anchoring is possible).

The Applicant subsequently devised a new apparatus, which is disclosed in EPA-02020520.9.

This apparatus comprises anchoring means that are fixed, in the active configuration, to the end portion of the pipe and to which a threaded pivot (arranged coaxially to the axis of the pipe) is coupled so that it can perform a longitudinal rotary and translational motion; supporting means for at least one tool, which can be arranged so as to interfere with, and remove material from, the outer surface of the end region of the pipe, are rigidly coupled to said pivot so that they rotate monolithically therewith.

The anchoring means comprise an annular retention element for first ends of centrally-pivoted lever systems, which are at least partially radial and angularly equidistant and support, so that they are articulated at second ends substantially in a rocker-like configuration, elements for resting against the inside wall of a pipe.

The retention element can perform an adjustable translational motion on a tubular supporting element, with which said threaded pivot engages internally; a disk protrudes from said supporting element, and said lever systems are pivoted thereto and therefore are articulated in order to change their inclination with respect to the axis and keep said supporting elements pushed against said pipe wall.

This apparatus also, however, can be improved; said apparatus is in fact excessively heavy, and this makes it difficult to handle and apply to the pipes and entails a constructive complexity that affects production costs.

In construction yard practice, moreover, there is often the need to replace portions of already-installed damaged pipelines.

The repair procedure generally consists in removing the portion of damaged pipeline; then, after performing the appropriate cleaning and scraping operations, two electroweldable sleeves are applied by fitting them over their entire length on the two ends of the pipes formed after removing the damaged portion. A new pipe segment is then inserted to replace the damaged portion, and the two sleeves are then subjected to a translational motion so that they adhere to the existing pipe over half of their length and to the new pipe over the other half. Welding is then performed.

Clearly, the region to be scraped that relates to the pipes of the old pipeline must be equal to the total length of the sleeves that are to be applied, in order to allow the sliding of the sleeve on the existing pipe during full insertion.

Currently known apparatuses do not allow great flexibility in the distance of the scraping from the end section of the pipe; the companies that manufacture these apparatuses in fact generally prepare different models depending on the possible welding distance and pipe diameters.

SUMMARY OF THE INVENTION

The aim of the present invention is to provide an apparatus for preparing the welding region on the outer surface of plastic pipes that solves the drawbacks mentioned above and exhibited by known apparatuses and is functionally more flexible.

Within this aim, an object of the present invention is to provide an apparatus for preparing the welding region on the outer surface of plastic pipes that combines considerable constructive simplicity with an equally considerable easy sliding and quick execution of the preparation of the outer surface of the pipes.

Another object of the present invention is to provide an apparatus for preparing the welding region on the outer surface of plastic pipes that can be fitted rapidly at the end of a pipe, reducing to a minimum the preparation and adjustment times.

Another object of the present invention is to provide an apparatus for preparing the welding region on the outer surface of plastic pipes that has a limited weight in comparison with known apparatuses.

A further object of the present invention is to provide an apparatus for preparing the welding region on the outer surface of plastic pipes that can be manufactured with known systems and technologies.

This aim and these and other objects that will become better apparent hereinafter are achieved by an apparatus for preparing the welding region on the outer surface of plastic pipes, which comprises anchoring means, which are fixed, in the active configuration, to the end region of the pipe, and to which a threaded pivot is coupled so that it can perform a longitudinal rotary and translational motion, supporting means for at least one tool being jointly coupled to said pivot, said tool being arrangeable so as to interfere with, and remove material from, the outer surface of the pipe, said apparatus being characterized in that said anchoring means comprise a central body on which there are longitudinal sliding guides for respective at least three rod-like elements, which protrude partially from said central body and are parallel to a same cross-sectional plane that is perpendicular to said threaded pivot, feet elements for resting against the inner surface of the pipe being provided at the outer ends of said rod-like elements, respective racks being further provided longitudinally at said rod-like elements and being kinematically connected to a common actuation gear system.

BRIEF DESCRIPTION OF THE DRAWINGS

Further characteristics and advantages of the present invention will become better apparent from the following detailed description of a preferred but not exclusive embodiment thereof, illustrated by way of non-limiting example in the accompanying drawings, wherein:

FIG. 3 is a perspective view of an internal cutout of part of the apparatus according to the invention;

FIG. 4 is a partially sectional side view of a portion of the apparatus according to the invention.

DESCRIPTION OF THE PREFERRED EMBODIMENTS

Figure 1:
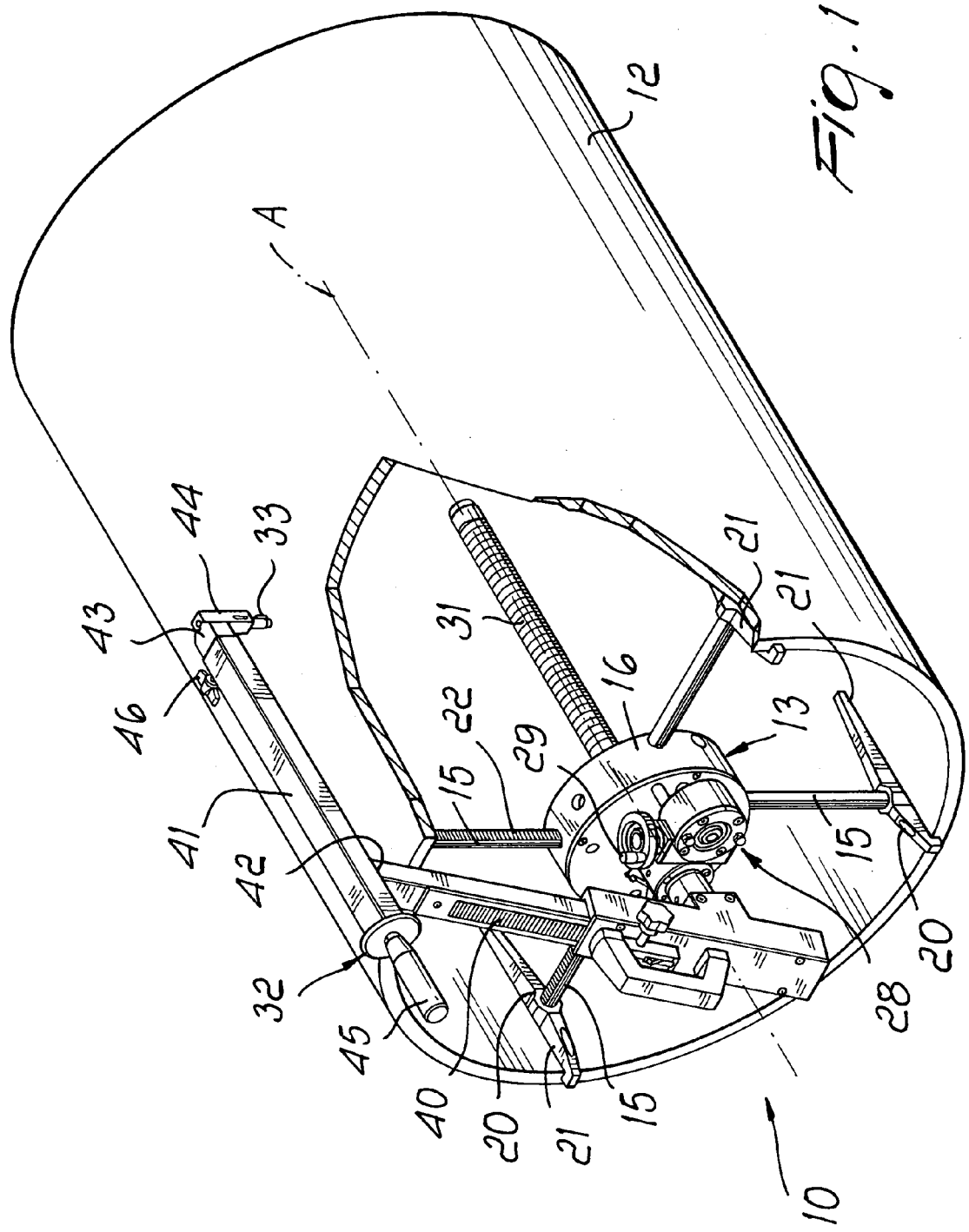
FIG. 1 is a perspective view of an apparatus according to the invention, applied to a pipe.
Figure 2:
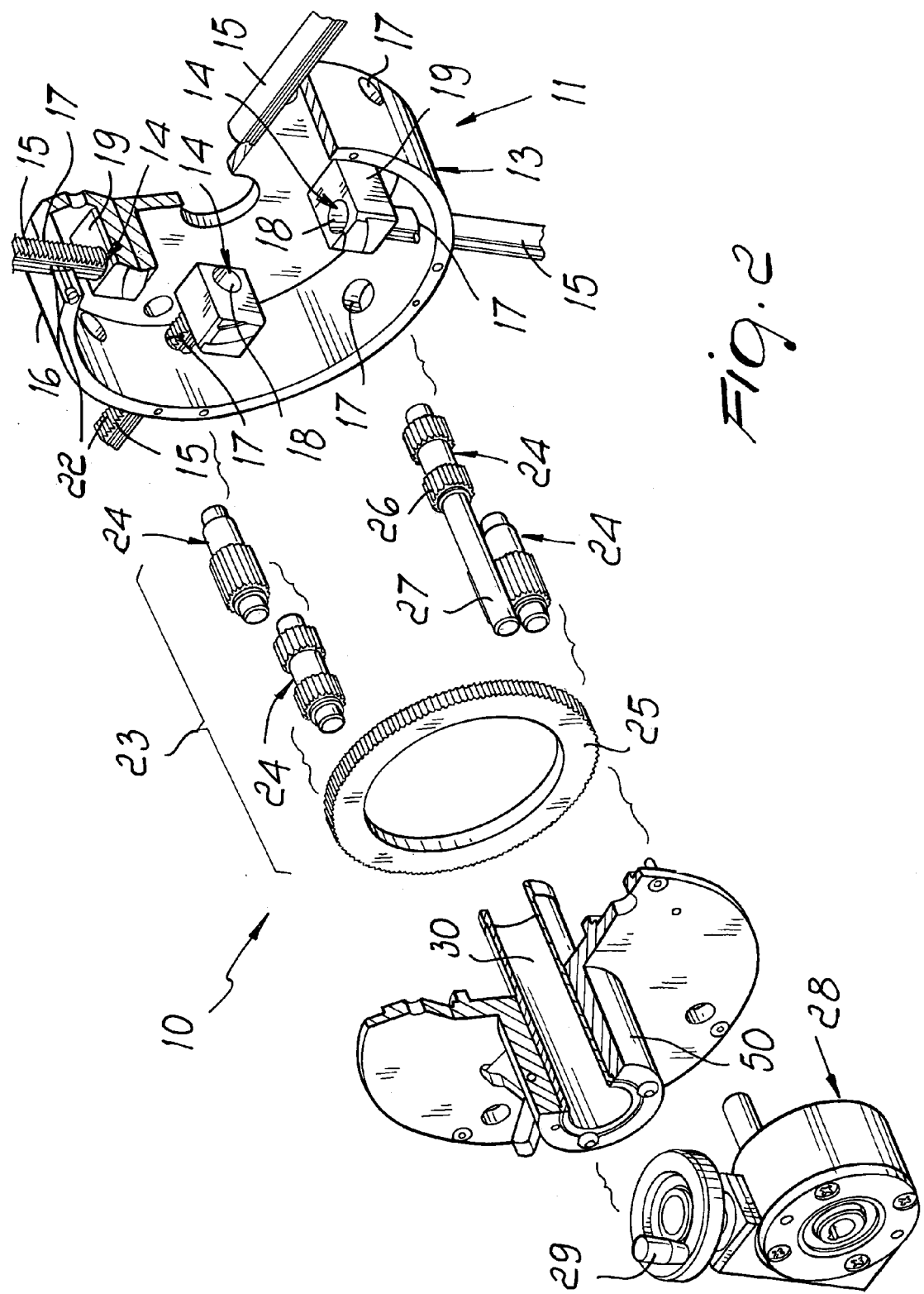
FIG. 2 is an exploded perspective view of part of an apparatus according to the invention.

With reference to the figures, an apparatus for preparing the welding region on the outer surface of plastic pipes, according to the invention, is generally designated by the reference numeral 10.

The apparatus 10 comprises anchoring means 11, which in the active configuration are fixed to the end region of the pipe, here designated by the reference numeral 12.

The anchoring means 11 comprise a central body 13, on which there are longitudinal sliding guides 14 for respective, in this embodiment, four rod-like elements 15 that protrude partially from the central body 13 in a non intersecting manner.

The central body 13 is constituted by a cylindrical box-like container 16, which is provided, at the cylindrical peripheral wall thereof, with four lateral holes 17 that are shaped complementary to the transverse cross-section of the rod-like elements 15, are located mutually equidistant at said peripheral wall and form part of the longitudinal sliding guides 14.

Each lateral hole 17 passes along a plane that crosses through the entire box-like container 16 and such hole is thus formed on mutually opposite parts of the box-like container 16.

The longitudinal sliding guides 14 further comprise through channels 18, which are coaxial to the corresponding lateral holes 17 and are formed in blocks 19 that protrude from the bottom surface 16a of the box-like container 16.

Each rod-like element 15 arranged on a direction that is perpendicular to the one of the contiguous rod-like element 15 and is parallel to a same cross-sectional plane of the container 16 that is perpendicular to the axis A of the cylindrical box-like container 16.

In order to prevent the rod-like elements 15 from mutually interfering during sliding in the corresponding guides 14, their extension direction is not radial, passing through a common center, but eccentric with respect to the axis of the box-like container 16.

Moreover, for the same reason, i.e. for not intersecting with each other, the rod-like elements 15 are arranged on two separate and parallel planes; in particular, the pairs of rod-like elements 15 that are mutually parallel are co-planar.

Feet elements 21 for resting on the inner wall surface of the pipe 12 are provided at the outer ends 20 of the rod-like elements 15.

A conical grub (not shown in the figures) is provided on each contact foot 21 and enters the thickness of the pipe 12 in order to ensure better fixing.

Respective racks 22 are formed longitudinally at the rod-like elements 15 and are connected kinematically to a common actuation gear system 23.

The common actuation gear system 23 is constituted by four transmission pinions 24, each of which meshes with a respective rack 22 of a rod-like element 15 and with a common ring gear 25.

The common ring gear 25 meshes directly with a toothed portion 26 of an output shaft 27 of a gear reduction unit 28, with which an actuation crank 29 arranged so as to be easily available for a user is associated.

The gear reduction unit 28 performs, for example, a ¹⁄₄₀ reduction; in this manner, the user requires minimal effort to move the rod-like elements 15.

In this embodiment, the toothed portion 26 of the output shaft 27 coincides with one of the transmission pinions 24.

Centrally with respect to the central body 13, there is a through bushing 30 supported at a flanged collar 50 for the rotary support of a threaded pivot 31 to which means 32 for supporting a tool 33 are jointly coupled; said tool is of a per se known type and can be arranged so as to interfere with, and remove material from, the outer surface of the pipe 12.

The threaded pivot 31 is coupled so as to perform a combined rotary and translational motion longitudinally along the bushing 30.

As clearly shown in FIG. 4, the apparatus in fact comprises guiding means 34 for rotation and translational motion, which are constituted by a lever 35 that is arranged partially in a compartment 36 that is connected to the inside of the bushing 30 and is pivoted to the central body 13 and has a complementary threaded portion 37 that can be coupled, depending on the inclination of the lever 35, to the thread of the threaded pivot 31.

An end 38 of the lever 35 is accessible to a user.

An elastic element 39 is further arranged on the end 38 and acts between the lever 35 and the central body 13, so that the complementarily threaded portion 37 is always coupled to the thread of the threaded pivot 31 and can be uncoupled by a user by moving the end 38 toward the central body 13.

The supporting means 32, of a per se known type, comprise a first telescopic rod-like arm 40, which has a substantially rectangular cross-section and is fixed, in a direction that is substantially radial with respect to the central body 13, to the free end of the threaded pivot 31.

The supporting means 32 also comprise a second rod-like arm 41, which has a substantially rectangular cross-section and has an end 42 that is rigidly coupled to the free end of the first rod-like arm 40 and an actuation knob 45.

The other end 43 of the second rod-like arm 41 has means 44 for supporting the tool 33, which are coupled thereto and are arranged substantially along a radial direction with respect to the pipe 12.

Advantageously, the second rod-like arm 41 is telescopic, and its related extension position is locked by a butterfly screw 46.

In practice, operation is as follows: the apparatus 10 is arranged at an end of the pipe 12 whose outer surface is to be machined.

The central body 13, with the rod-like elements 15 and with their respective feet elements 21, is inserted in the hole of the pipe 12.

By acting on the actuation crank 29, the reduction unit 28 is actuated and accordingly so is the gear system 23.

The rod-like elements 15 perform a translational motion on the guides 14, until the feet elements 21 are pushed with sufficient force against the internal walls of the pipe 12.

In this configuration, the threaded pivot is substantially coaxial to said pipe apart from any roundness errors of the pipe 12.

The operator then adjusts the length of the first rod-like arm 40, of the second arm 41 and of the means 44, and therefore ultimately of the tool 33, according to the diameter of the pipe 12 and to the distance of the region to be scraped with respect to the terminal edge of the pipe 12.

The operator, by acting on the knob 45, then turns the second rod-like arm 41, performing the actual process.

The rotation of the threaded pivot 31 is rigidly associated with the rotation of the second arm 41, and said pivot performs a rotary and translational motion, causing the advancement of the first rod-like arm 40 and therefore of the process.

By acting on the lever 35, it is possible to release the grip on the threaded pivot 31, so as to make it perform a translational motion and rotation freely along its own axis, according to the requirements.

In practice, it has been found that the invention thus described solves the problems noted in known types of apparatus for preparing the welding region on the outer surface of plastic pipes; in particular, the present invention provides an apparatus for preparing the welding region on the outer surface of plastic pipes that is more compact and lighter than known apparatuses and adapts easily to pipes whose diameters and thickness are within a wide interval, at the same time saving energy and assembly time with respect to known apparatuses.

Moreover, thanks to the second telescopic arm, the invention can be adapted easily to operating situations in which it is necessary to scrape pipe portions that are very distant from the end section where said apparatus is applied, as in the case of the repair of damaged pipelines.

Said apparatus, further, is constructively simpler than known apparatuses, to the full benefit of overall production costs.

Moreover, an apparatus such as the one described can be used easily even by non-specialized personnel.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2003A000241 from which this application claims priority are incorporated herein by reference.

What is claimed is:

1. An apparatus for preparing a welding region on an outer surface of a plastic pipe, comprising: anchoring means for anchoring to an inner surface of the pipe, which are fixed, in an active configuration thereof, to an end region of the pipe; a threaded pivot coupled to said anchoring means so as to be movable longitudinally with respect to the pipe by a rotary-translational motion; supporting means being jointly coupled to said pivot for at least one tool supported at said supporting means so as to be arrangeable to interfere with, and remove material from the outer surface of the pipe, and wherein said anchoring means comprise a central body, longitudinal sliding guides arranged at said central body, at least three rod-like elements mounted at said sliding guides so as to protrude partially from said central body, said rod-like elements laying and being slidingly movable in said sliding guides parallel to a cross-sectional plane that is perpendicular to said threaded pivot, feet elements provided at outer ends of said rod-like elements for resting against the inner surface of the pipe, and respective racks provided longitudinally at said rod-like elements, and a common actuation gear system to which said racks are kinematically connected, said central body being constituted by a cylindrical box-like container, on which said longitudinal sliding guides are provided, said guides comprising four lateral holes that extend through said box-like container so as to open on opposite parts of a peripheral wall of said box-like container, said lateral holes being shaped in cross-section complementarily with respect to a transverse cross-section of said rod-like elements and being located mutually equidistant on said peripheral wall of to box-like container, said longitudinal sliding guides further comprising through channels, which are coaxial to corresponding ones of said lateral holes and are formed in blocks that protrude from a bottom surface of said box-like container.

2. The apparatus of claim 1, wherein said common actuation gear system comprises transmission pinions, each of which meshes with a respective said rack of a corresponding said rod-like element, a gear reduction unit with an actuation crank and which has an output shaft, and a common ring gear, meshing with a toothed portion of said output shaft.

3. The apparatus of claim 2, wherein said toothed portion of said output shaft is formed so as to coincide with one of said transmission pinions.

4. The apparatus of claim 1, comprising four of said rod-like elements.

5. The apparatus of claim 4, wherein each one of said rod-like elements lays on a direction that is perpendicular to the one of the contiguous rod-like element and is parallel to the cross-sectional plane that is perpendicular to the axis of said threaded pivot, the direction of each said rod-like element being eccentric with respect to an axis of said treaded pivot, and pairs of said rod-like elements that are mutually parallel being arranged co-planar.

6. The apparatus of claim 5, comprising a bushing for rotational support of said threaded pivot that is arranged so as to pass centrally through said central body.

7. The apparatus of claim 1, wherein said supporting means comprise a first telescopic rod-like arm, which is fixed, along a substantially radial direction with respect to said central body, to a free end of said threaded pivot, a second rod-like arm, which has a first end thereof that is rigidly coupled to a free end of said first rod-like arm and a second end provided with said tool supporting means for supporting a tool, said second rod-like arm being telescopic.

8. An apparatus for preparing a welding region on an outer surface of a plastic pipe, comprising: anchoring means anchoring to an inner surface of the pipe, which are fixed, in an active configuration thereof, to an end region of the pipe; a threaded pivot coupled to said anchoring means so as to be movable longitudinally with respect to the pipe by a rotary-translational motion; supporting means being jointly couple to said pivot for at least one tool supported at said supporting means so as to be arrangeable to interfere with, and remove material from the outer surface of the pipe, and wherein said anchoring means comprise a central body, longitudinal sliding guides arranged at said central body, at least three rod-like elements mounted at said sliding guides so as to protrude partially from said central body, said rod-like elements laying and being slidingly movable in said sliding guides parallel to a cross-sectional plane that is perpendicular to said threaded pivot, feet element provided at outer ends of said rod-like elements for resting against the inner surface of the pipe, and respective racks provided longitudinally at said rod-like elements, and a common actuation gear system to which said racks are kinematically connected, the apparatus comprising four of said rod-like element, each one of said rod-like elements lying on a direction that is perpendicular to the one of the contiguous rod-like element and is parallel to the cross-sectional plane that is perpendicular to the axis of said threaded pivot, the direction of each said rod-like element being eccentric with respect to an axis of said threaded pivot, and pair of said rod-like element that are mutually parallel being arranged co-planar, the apparatus further comprising a bushing for rotational support of said threaded pivot that is arranged so as to pass centrally through said central body, and the apparatus further comprising guiding means for rotary-translational motion guiding of said threaded pivot, which comprise: a collar and a lever, which is arranged partially in a compartment of said collar, said compartment being connected to an inside part of said bushing, said lever being pivoted to said central body and having a complementary threaded portion that is couplable, depending on an inclination of the lever, for driving engagement with a thread region of said threaded pivot, an end of said lever being free and available for user-actuation.

9. The apparatus of claim 8, comprising an elastic element arranged on said end of the lever for elastic action between said lever and said central body.

* * * * *